United States Patent
North et al.

(10) Patent No.: US 9,007,896 B2
(45) Date of Patent: Apr. 14, 2015

(54) CONGESTION CONTROL BASED ON CALL RESPONSES

(75) Inventors: Kirby L. North, Richardson, TX (US); Peter E. Hanson, Garland, TX (US); Carl T. Leonard, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 716 days.

(21) Appl. No.: 12/574,885

(22) Filed: Oct. 7, 2009

(65) Prior Publication Data

US 2011/0080828 A1 Apr. 7, 2011

(51) Int. Cl.
*H04L 1/00* (2006.01)
*H04L 29/08* (2006.01)
*H04L 12/803* (2013.01)
*H04L 29/14* (2006.01)
*H04L 29/06* (2006.01)

(52) U.S. Cl.
CPC .......... *H04L 67/2814* (2013.01); *H04L 47/122* (2013.01); *H04L 65/1069* (2013.01); *H04L 65/80* (2013.01); *H04L 69/40* (2013.01)

(58) Field of Classification Search
USPC .......... 370/229–235, 351–356, 395.2, 395.21
See application file for complete search history.

(56) References Cited

U.S. PATENT DOCUMENTS

| | | | |
|---|---|---|---|
| 6,965,562 B2* | 11/2005 | Tuomi | 370/230 |
| 2008/0175174 A1* | 7/2008 | Altberg et al. | 370/259 |
| 2009/0275343 A1* | 11/2009 | Monnes et al. | 370/235 |

* cited by examiner

*Primary Examiner* — Pao Sinkantarakorn

(57) ABSTRACT

A method may include receiving a number of calls and identifying destinations associated with the calls, where a first portion of the calls are associated with a first destination. The method may also include determining whether failure responses associated with calls forwarded toward the first destination indicate a problem or a possible problem associated with forwarding calls toward the first destination. The method may further include blocking, when the failure responses indicate a problem or a possible problem, at least some of the first portion of calls from being forwarded toward the first destination.

18 Claims, 5 Drawing Sheets

CONGESTION CONTROL BASED ON CALL RESPONSES

BACKGROUND INFORMATION

Processing and routing data, calls, etc., in a network has become increasingly complex due to increased overall traffic. In addition, destination locations or devices associated with routing traffic are often overloaded with calls at various times. This may lead to congestion-related problems at the destination locations and/or congestion-related problems in the overall network.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to processing calls. In an exemplary implementation, a call processing device may monitor call responses, such as failure responses, associated with forwarded calls. The call processing device may determine whether the failure responses match a particular pattern, rule, or criteria. Such failure responses may indicate congestion-related problems in a portion of the network. If the failure responses match a pattern, rule or criteria, the call processing device may block or reduce the number of calls forwarded to one or more destinations. The call processing device may also dynamically monitor network conditions. For example, when the failure response indicate that the congestion problem no longer exists, the call processing device may forward all calls to the previously congested portion of the network.

Figure 1:
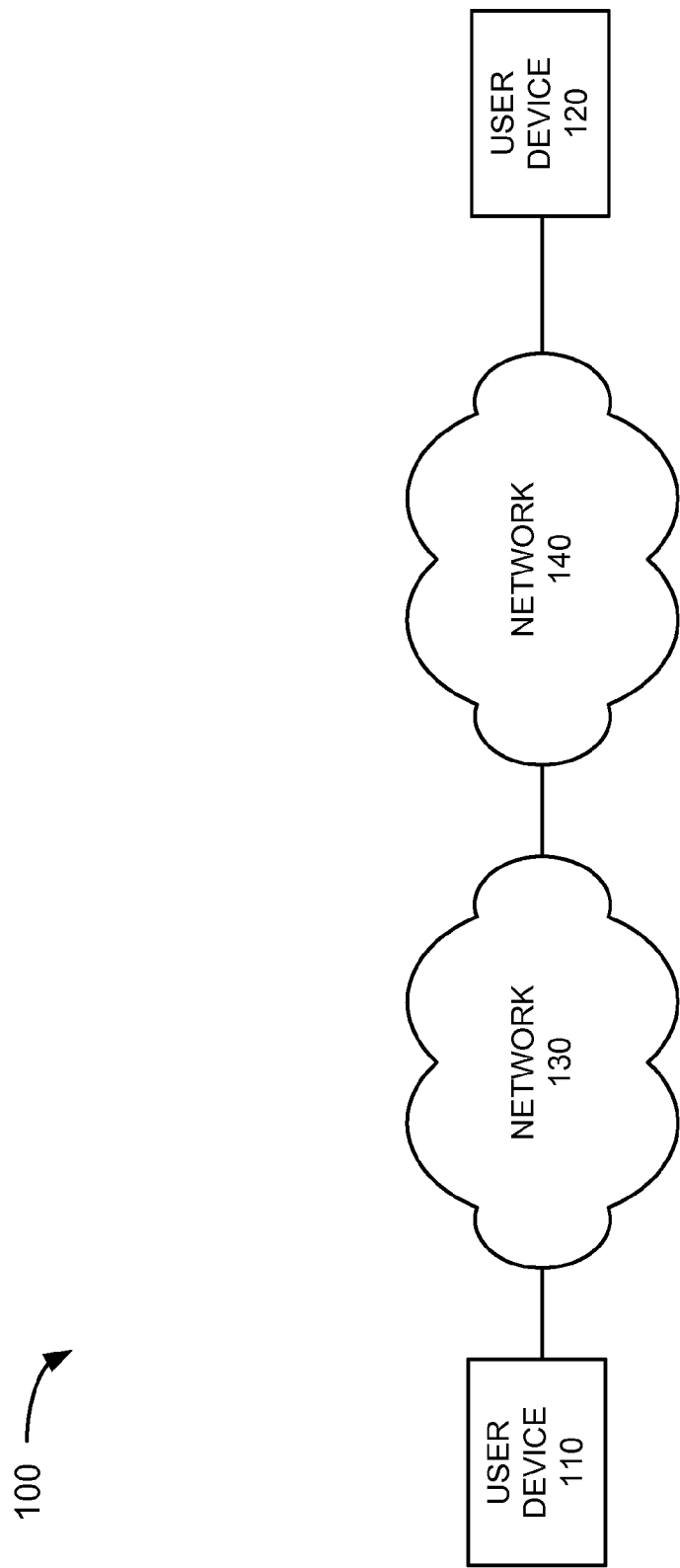
FIG. 1 illustrates an exemplary network in which systems and methods described herein may be implemented.

FIG. 1 is a block diagram of an exemplary network 100 in which systems and methods described herein may be implemented. Network 100 may include user devices 110 and 120 and networks 130 and 140. Each of user devices 110 and 120 may include any device or combination of devices capable of transmitting voice signals and/or data to a network, such as networks 130 and/or 140.

In an exemplary implementation, user device 110 may represent a voice over Internet protocol (VoIP) subscriber that makes and receives telephone calls using VoIP. For example, user device 110 may include a telephone system/device, such as a VoIP telephone (e.g., a session initiation protocol (SIP) telephone), that makes and receives telephone calls using VoIP. In some instances, the VoIP telephone (i.e., user device 110) may be designed to look like a conventional plain old telephone system (POTS) telephone. Alternatively, user device 110 may include any type of computer system, such as a personal computer (PC), a laptop, a personal digital assistant (PDA) or the like, that can make and receive VoIP calls. In still other alternatives, user device 110 may include a POTS telephone device.

In an exemplary implementation, user device 120 may include a telephone device, such as a POTS telephone device, a wireless or cellular telephone device (e.g., a personal communications system (PCS) terminal that may combine a cellular radiotelephone with data processing and data communications capability, a PDA that can include a radiotelephone, or the like), etc. Alternatively, user device 120 may include any type of telephone device/system similar to user device 110. User devices 110 and 120 may connect to networks 130 and 140, respectively, via any conventional technique, such as wired, wireless, or optical connections.

Network 130 may include one or more packet switched networks, such as an Internet protocol (IP) based network, a local area network (LAN), a wide area network (WAN), a personal area network (PAN) an intranet, the Internet, or another type of network that is capable of transmitting and receiving data. In an exemplary implementation, network 130 may include a VoIP-based network for transmitting and receiving VoIP calls to/from VoIP subscribers, such as a subscriber associated with user device 110.

Network 140 may include one or more wired and/or wireless networks that are capable of receiving and transmitting data, voice, and/or video signals, including multimedia signals that include voice, data, and video information. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination.

The exemplary configuration illustrated in FIG. 1 is provided for simplicity. It should be understood that a typical network may include more or fewer devices than illustrated in FIG. 1. For example, network 100, may include thousands of user devices similar to user devices 110 and 120. In addition, network 100 may include additional elements, such as switches, gateways, routers, etc., that aid in routing traffic, such as telephone calls, as described in more detail below. Further, networks 130 and 140 are shown as separate networks. In other implementations, the functions performed by one or more of networks 130 and 140 may be performed by a single network.

Figure 2:
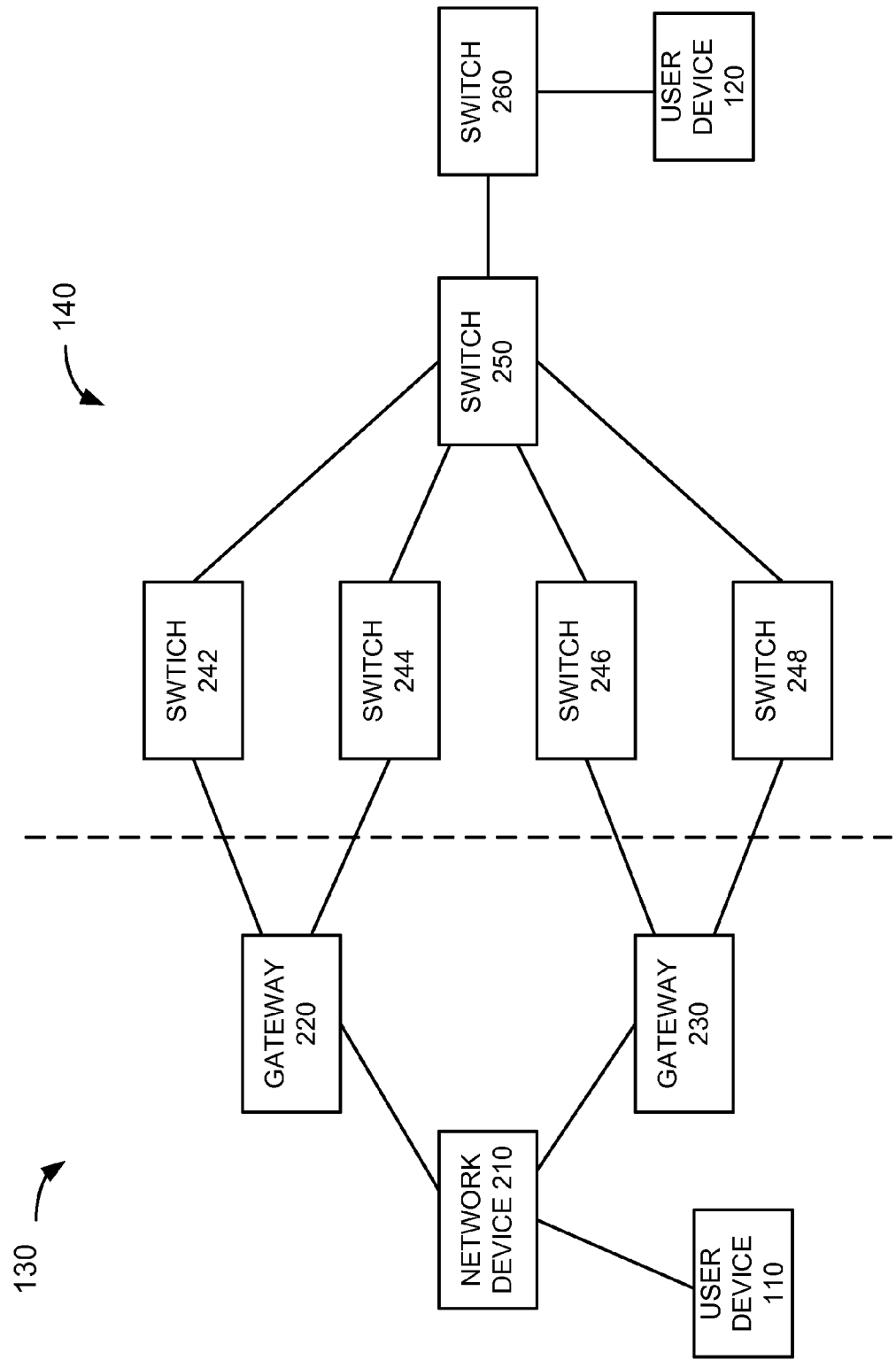
FIG. 2 illustrates an exemplary configuration of network components implemented in the network of FIG. 1.

FIG. 2 illustrates an exemplary configuration of components implemented in networks 130 and 140, shown separated by the dotted line. Referring to FIG. 2, network 130 may include network device 210 and gateways 220 and 230. Network 140 may include switches 242, 244, 246, 248, 250 and 260. It should be understood that networks 130 and 140 may include additional devices that aid in routing traffic.

In an exemplary implementation, network device 210 (also referred to herein as VoIP proxy 210) may be a proxy device that receives and processes calls from VoIP subscribers, such as a VoIP subscriber represented by user device 110. VoIP proxy 210 may identify destination information associated with user calls and forward the calls to the appropriate gateway or other device in network 130. In an exemplary implementation, VoIP proxy 210 may also monitor call setup messages and failure responses associated with calls. For example, VoIP proxy 210 may monitor all new calls received from user devices, such as user device 110, and also monitor responses, such as failure responses, received from network 140. This information may then be used to identify portions of network 140 that may be overloaded and/or experiencing congestion-related problems.

Gateways 220 and 230 may represent gateway devices that receive calls from VoIP proxy 210 and forward the calls toward their destinations. In some implementations, a VoIP call from network 130 may be destined for a user device coupled to network 140. In such instances, gateways 220 and 230 may act as the interface between a VoIP network, such as network 130, and a PSTN-based network, such as network 140.

Each of switches 242, 244, 246 and 248 may represent a network device that is able to process received calls, make switching or routing decisions and forward the calls toward their respective(s) destinations. In some implementations, each of switches 242-248 may be a class 3 type switch configured to handle calls in a PSTN-based network. In an exemplary implementation, each of switches 242-248 may communication with other network devices, such as gateways 220 and 230, and other switches, such as switch 250.

Switch 250 may represent a network device, such as a class 3 switch, that forwards calls toward their intended destination. For example, switch 250 may receive calls forwarded from one or more of switches 242-248, and forward the calls to, for example, switch 260. Switch 260 may represent a network device, such as a class 4 or class 5 switch. That is, switch 260 may be an end-office switch or central office switch that is coupled to end user devices, such as user device 120, and other switches in network 140, such as switch 250, as illustrated in FIG. 2.

As described briefly above, VoIP proxy 210 may track failure responses associated with calls forwarded to, for example, network 140. When the failure responses exceed a predetermined level or match a pattern, congestion controls may be implemented by VoIP proxy 210 to block (e.g., drop) VoIP calls from being forwarded to another network, such as network 140, as described in detail below. Blocking calls in network 130 may prevent further congestion on a network, such as network 140.

For example, in a conventional network, a single call from user device 110 intended for user device 120 may be attempted several times. For example, network device 210 may route a call from user device 110 to gateway 220. Gateway 220 may attempt to route the call to user device 120 via switch 242, which forwards the call to switch 250 and on to switch 260. If the call is unable to be forwarded to user device 120, gateway 220 may forward the call to switch 244, which will forward the call to switch 250 and on to switch 260. If that attempt is unsuccessful, network device 210 may forward the call to gateway 230, which will attempt to route the call via switch 246, which will forward the call to switch 250 and on to switch 260. Similarly, if that attempt is unsuccessful, gateway 230 may forward the call to switch 248, which will forward the call to switch 250 and on to switch 260. In this manner, a single call may be attempted several times, thereby consuming network resources. In some instances, a same PSTN trunk group from a class 3 switch (e.g., switch 250) to a class 4/5 switch (e.g., switch 260) will be accessed several times (e.g., up to four times in the scenario described above). Attempting to complete a single call in this manner increases messaging in networks 130 and 140 and consumes bandwidth. Blocking calls based on network conditions may help alleviate congestion conditions and reduce processing load, as described in detail below.

Figure 3:
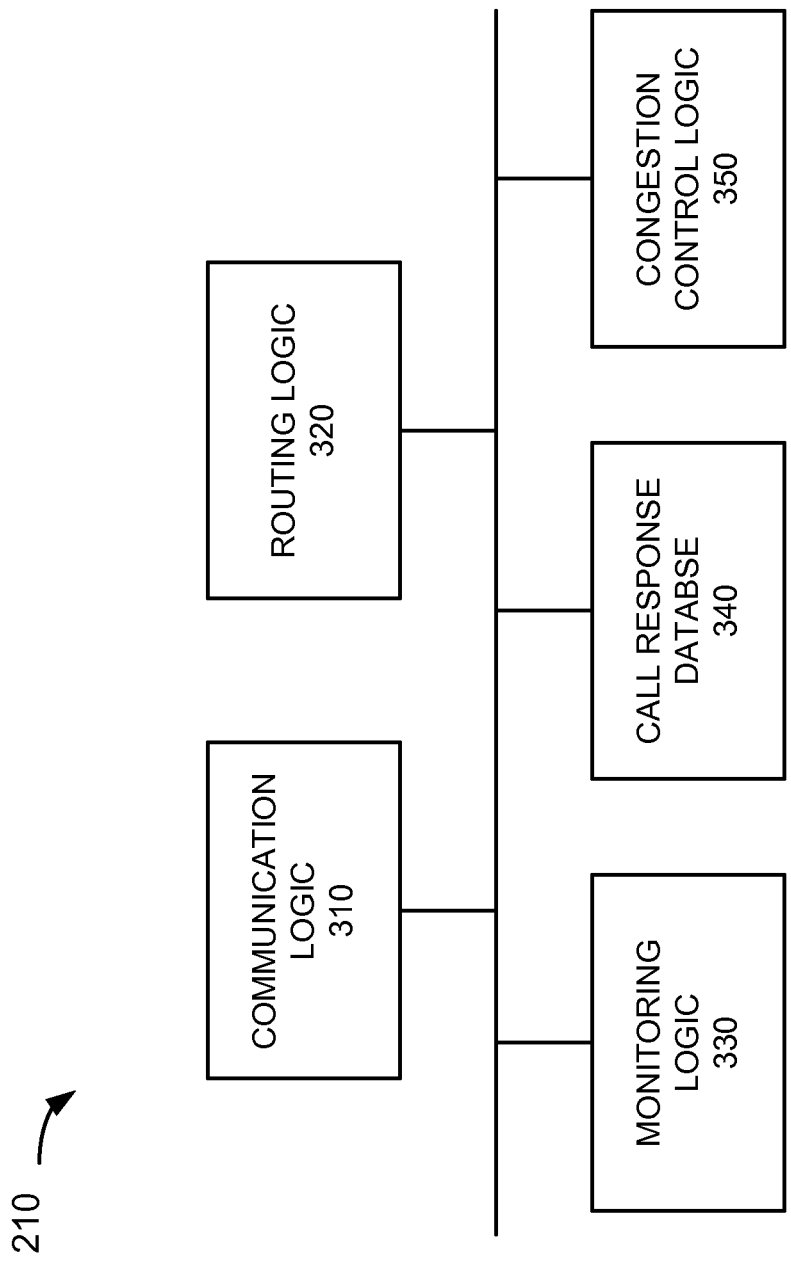
FIG. 3 illustrates an exemplary configuration of logic components implemented in one of the network components of FIG. 2.

FIG. 3 illustrates an exemplary configuration of logic components implemented in network device 210. Referring to FIG. 3, network device 210 may include communication logic 310, routing logic 320, monitoring logic 330, call response database 340 and congestion control logic 350. It should be understood that network device 210 may include more or fewer logic devices than illustrated in FIG. 3. For example, network device 210 may include additional elements that aid in routing incoming calls.

Communication logic 310 may include logic that allows network device 210 to communicate with other devices in networks 130 and 140. For example, communication logic 310 may allow network device 210 to communicate with user devices, such as user device 110, and gateways, such as gateways 220 and 230.

Routing logic 320 may include logic for processing calls and forwarding the calls toward their intended destinations. For example, routing logic 320 may include call processing rules and forwarding tables for identifying a destination for a call and routing the call toward the destination.

Monitoring logic 330 may include logic that receives data from communication logic 310 and tracks the number of calls and responses to the calls. For example, monitoring logic 330 may track failure responses received from network 140. Monitoring logic 330 may store this information in, for example, call response database 340. Monitoring logic 330 may track successfully completed calls via acknowledgement messages returned from network 140. Alternatively, if no failure response is received from network 140, monitoring logic 330 may identify the call as a success.

Call response database 340 may include information identifying a number of calls forwarded to various destinations. In an exemplary implementation, call response database 340 may also include information identifying failure responses identified by monitoring logic 330. The failure response information may be used to determine whether to allow, block, or throttle back the number of calls directed towards certain routes or destinations, as described in detail below.

Congestion control logic 350 may include logic that manages the transmission of incoming calls toward the respective destinations. For example, congestion control logic 350 may access the information stored in call response database 340 identifying the number of calls successfully transmitted to the end user device as well as the number of calls that failed to be completed. Congestion control logic 350 may then determine whether calls from network 130 to network 140 should be blocked or whether the number of calls forwarded to a particular destination should be reduced for a period of time, as described in more detail below.

In an exemplary implementation, communication logic 310, routing logic 320, monitoring logic 330, call response database 340 and congestion control logic 350 may include one or more processors, microprocessors or other processing logic used to interpret and execute instructions. In such implementations, the logic components may include software instructions stored in a computer-readable medium. A computer-readable medium may be defined as one or more memory devices. The software instructions may be read into memory from another computer-readable medium or from another device via a communication interface. The software instructions contained in memory may cause the various logic components to perform processes that are described below. Alternatively, hardwired circuitry may be used in place of or in combination with software instructions to implement the logic processes consistent with the exemplary embodiments. Thus, systems and methods described herein are not limited to any specific combinations of hardware circuitry, firmware, and software.

Figure 4:
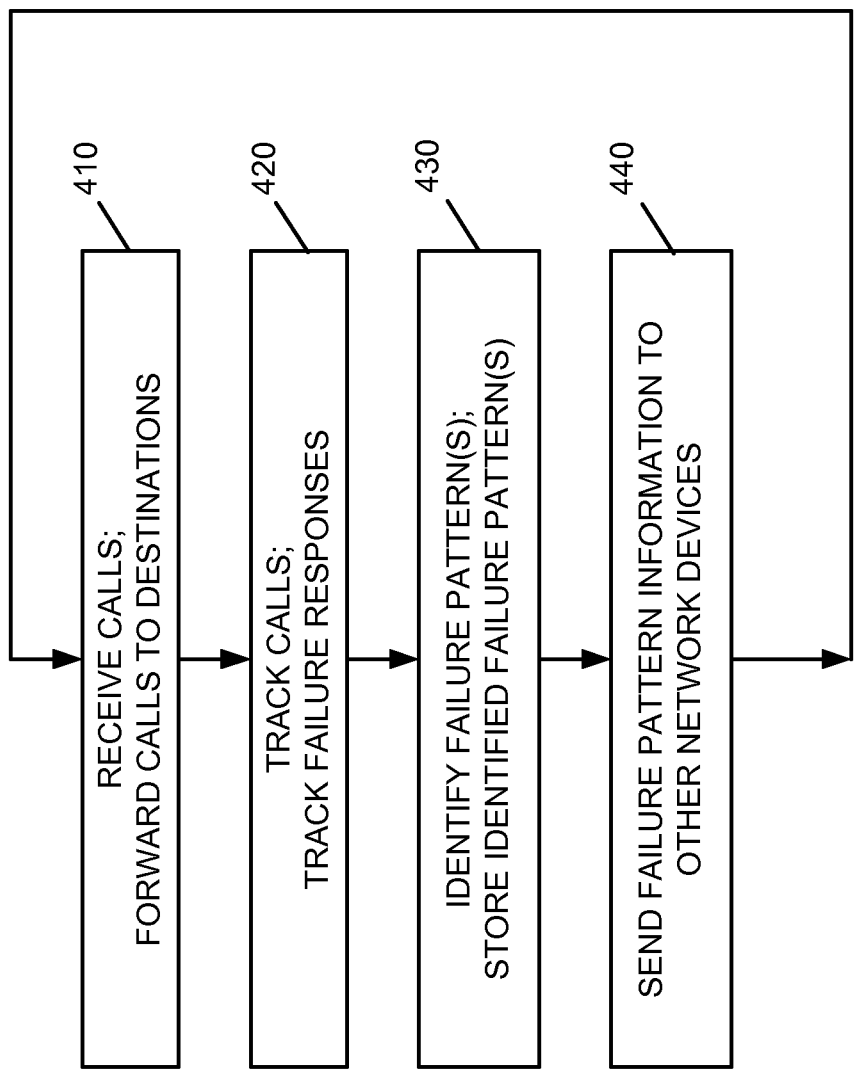
FIGS. 4 and 5 are flow diagrams illustrating exemplary processing by various components illustrated in FIG. 2.

FIG. 4 is a flow diagram illustrating exemplary processing associated with processing calls in network 100. Processing may begin with network 130 processing calls to be transmitted to end user devices (e.g., user device 120) via network 140 (act 410). For example, as discussed above, network 130 may be a VoIP-based network and network 140 may be a PSTN-based network. In this instance, network 130 may process VoIP calls intended for PSTN-based end user devices coupled to network 140.

Assume that network device 210 receives the calls. Routing logic 320 may identify the respective destinations of the incoming calls and forward the calls toward their respective destinations (act 410). For example, routing logic 320 may forward the calls to gateways 220 and 230.

Monitoring logic 330 may also track calls received by network device 210 (act 420). For example, monitoring logic 330 may track the number of calls and the individual call destinations associated with the calls. In an exemplary implementation, monitoring logic 330 may identify the call destinations by, for example, the numbering plan area code (NPA) dialed/input by the caller, the central office/end office or exchange code (NXX) dialed/input by the caller, a combination of NPA/NXX, a country code, city code and/or rate center associated with the destination of the call, etc.

After the destination of the incoming call has been determined, monitoring logic 330 may store the information in call response database 340. Monitoring logic 330 may also track responses associated with forwarded calls (act 420). For example, monitoring logic 330 may detect failure responses received from network 140 in response to a forwarded call that failed (e.g., was unable to be completed to the end user) and store this information in call response database 340. The failure response may be sent by a device in network 140, such as a switch 260, or another switch in network 140. In each case, monitoring logic 330 may track calls sent to network 140 and failure responses received from network 140. As discussed above, in some instances, network 140 may forward an acknowledgement message upon successful completion of a call. In other instances, if no failure response is received from network 140, monitoring logic 330 may identify the call as a success.

Congestion control logic 350 may access call response database 340 and identify any failure patterns (act 430). For example, congestion control logic 350 may determine whether failure responses from network 140 match one or more pre-defined patterns, rules or other criteria. As an example, the pre-defined patterns may include patterns (e.g., numerical patterns) that include leading digits of the destination telephone numbers, such as NPA, NPA/NXX, country code. The predefined patterns may also include patterns (e.g., numerical patterns) associated with portions of the destination telephone number that correspond to a city code, a rate center, a particular central office, an end-office switch, etc. As one example, congestion control logic 350 may identify whether a predetermined number of failure responses for calls destined for particular NPA have been received within a predetermined period of time. As another example, congestion control logic 350 may determine whether failure responses associated with a particular NPA/NXXX exceed a predetermined percentage of calls to that NPA/NXX.

In each case, congestion control logic 350 may determine whether failure responses stored in call response database 340 match a pattern, rule or other predefined criteria. In this manner, congestion control logic 350 may identify an area of network 140 that may be congested or is experiencing some other problem. The term "congested" as used herein, should be construed as any condition in which a network or network device is overloaded with traffic and/or is experiencing any problem (e.g., has failed) that causes the network or network device to be unable to successfully complete or forward a call.

Assume that congestion control logic 350 identifies a patterns of failures associated with a particular NPA/NXX. In this case, congestion control logic 350 may store the identified failure pattern (act 430). For example, congestion control logic 350 may store the identified failure pattern in call response database 340 or in some other database accessible by congestion control logic 350. Congestion control logic 350 may then use this failure pattern information when forwarding calls, as described in detail below.

In some implementations, congestion control logic 350 may forward the identified failure pattern information to other devices in network 130 (act 440). For example, congestion control logic 350 may forward information identifying failure patterns to other VoIP proxy devices in network 130. Similarly, network device 210 may receive failure pattern information from other devices in network 130. This may allow network devices 210 to share information that may be used to block calls to particular destinations that may be experiencing congestion or other problems, as described in more detail below.

Processing may continue in this manner at network device 210. That is, network device 210 may dynamically monitor traffic destined for network 140 and identify failure patterns. The failure pattern information may then be used to block or throttle back/reduce the number of calls destined for a congested location/destination on network 140, etc., as described in more detail below.

Figure 5:
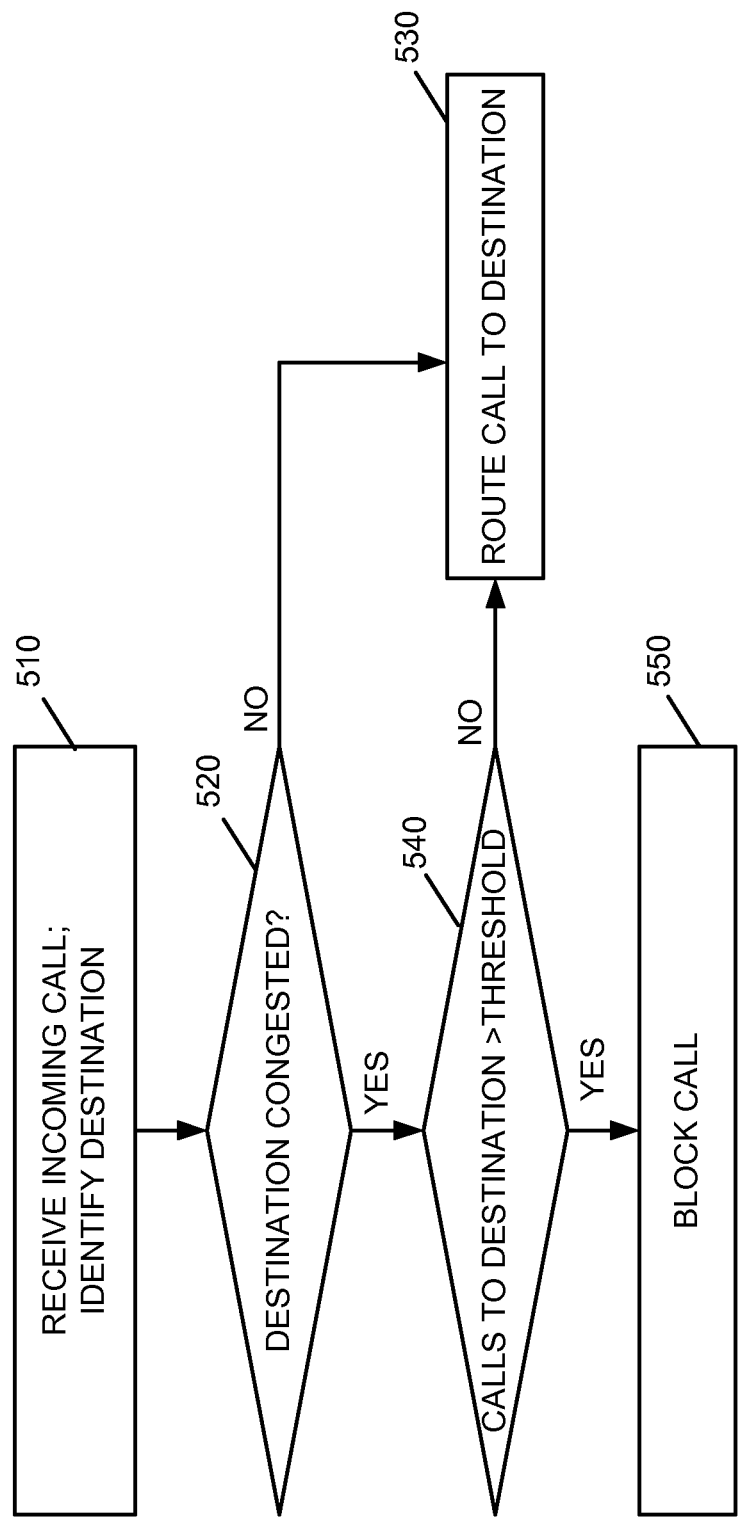

FIG. 5 illustrates exemplary processing associated with processing calls in network 100. Processing may begin with a party at user device 110 placing a call to a party at user device 120. Assume that network device 210 receives the call from user device 110 and identifies the destination (act 510). For example, routing logic 320 may identify the destination associated with the call.

Congestion control logic 350 may determine whether the destination for the call is congested, experiencing some other problem or is possibly experiencing a problem (act 520). For example, congestion control logic 350 may access call response database 340 and determine whether the destination matches any patterns stored in call response database 340. As one example, suppose that the call is destined for switch 260 and call response database 340 indicates that switch 260 is congested or experiencing (or potentially experiencing) other problems. That is, call response database 340 may store information indicating that the failure responses associated with calls forwarded to switch 260 exceed some predetermined level/threshold. As discussed above, in some instances, the failure responses may be measured over a period of time in raw numbers (e.g., total number of failure responses), or as a percentage of failure responses with respect to total calls destined for switch 260, or in other ways. When the failure responses exceed some predetermined level/threshold, this may indicate congestion or possibly another problem.

If no congestion is detected by congestion control logic 350, (act 520—no), routing logic 320 may forward the call toward its destination (act 530). If, however, congestion control logic 350 detects a congestion condition (act 520—yes), congestion control logic 350 may determine whether the number/volume of calls currently being forwarded to destination switch 260 exceeds some predetermined level (act 540).

For example, once congestion control logic 350 identifies switch 260 as congested, congestion control logic 350 may allow a predetermined number of calls (e.g., a predetermined number of calls per second) to reach destination switch 260. Congestion control logic 350 may then determine the total number of calls currently being processed that are destined for switch 260. If the number of calls being forwarded to switch 260 by network device 210 exceeds the predetermined level (act 540—yes), the call may be blocked from being forwarded (e.g., dropped) (act 550). If, however, the number/volume of calls being forwarded to switch 260 does not exceed the predetermined level, the call may be routed to the destination (act 530).

In this manner, congestion control logic 350 may determine whether a destination for a call matches a pattern, rule or criteria in call response database 330 corresponding to a congested device in network 140 or a congested portion of network 140. Congestion control logic 350 may also identify call volume allowed for each congested device or portion of network 140 and determine whether to block the call based on the call volume.

In other implementations, if congestion control logic 350 determines that the destination associated with a call is congested or is experiencing other problems, congestion control logic 350 may block or drop the call. That is, network device 210 may forward no calls to that destination while congestion control logic 350 indicates that the failure responses associated with that particular destination exceed some predetermined level.

As also described above with respect to FIG. 4, network device 210 may share failure pattern information with other devices in network 130. For example, network device 210 may share information identifying devices/areas of network 140 with other network devices similar to network device 210. Similarly, network device 210 may receive failure pattern information from other network devices in network 130. Network device 210 may store this information in call response database 340 or another database accessible by congestion control logic 340. In this manner, network device 210 may be able to more quickly identify congested areas/devices of network 140 by leveraging information from other devices in network 140. Network device 210 may then block calls directed toward those areas/devices of network 140.

In each case, network device 210 may quickly identify devices in network 140, such as switches, or portions of network 140 experiencing congestion-related problems or other problems (e.g., failures or partial failures). Network device 210 may then block or reduce the number of calls to these devices/areas to avoid sending calls multiple times to portions of network 140 that are unable to successfully terminate the calls at the end user device.

Implementations described herein provide for detecting areas of a network that may be congested or experiencing other problems prior to routing calls to those portions of the network. As a result, network traffic may be reduced. In addition, as network conditions change, calls may be routed to formerly congested areas of the network.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to forwarding calls from an IP-based network to a PSTN-based network. In an alternative implementation, similar processing may be performed in other types of networks. For example, identifying problematic areas within an IP network may be performed in a similar manner as that described above. In such implementations, the destination information for a call may correspond to an IP address. In these implementations, congestion control logic 350 may match failure responses to patterns that identify a destination IP address or range of IP addresses. In still other implementations, networks 130 and 140 may include congestion control devices that handle congestion related problems in both PSTN based network and VoIP based networks.

In addition, implementations described above refer to blocking calls or reducing the number of calls based on failure response information. In some implementations, the amount of calls permitted to be forwarded to a destination identified as being problematic may be dynamically changed as calls are being processed. That is, congestion control logic 350 may iteratively adjust the number of calls forwarded to a problematic area based on real time or near real time information associated with forwarded calls. This may allow network device 210 to slowly increase the volume of calls (e.g., calls per second) forwarded to a congested area of network 140. Alternatively, the congestion control device may throttle calls for a fixed period of time before potentially adjusting the volume of forwarded calls.

Further, while series of acts have been described with respect to FIGS. 4 and 5, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving, by a network device, a plurality of calls from user devices;
   identifying, by the network device, destinations associated with the plurality of calls, wherein a first portion of the plurality of calls are to be forwarded toward a first destination;
   forwarding, by the network device, the plurality of calls toward the identified destinations;
   receiving, by the network device, failure responses associated with at least some of the first portion of the plurality of calls, wherein the failure responses indicate that the at least some of the first portion of the plurality of calls were unable to be completed;
   determining whether the failure responses associated with calls forwarded toward the first destination indicate a problem associated with forwarding calls toward the first destination, wherein the determining whether the failure responses indicate a problem comprises:
automatically determining whether the failure responses match at least one of a plurality of predefined patterns;
receiving, by the network device, a second plurality of calls, wherein a second portion of the second plurality of calls are associated with the first destination; and
blocking, by the network device, when the failure responses associated with calls forwarded toward the first destination indicate a problem, at least some of the second portion of calls from being forwarded toward the first destination, and
wherein the automatically determining whether the failure responses match at least one of a plurality of predefined patterns comprises:
identifying at least one of a numbering plan area code, a central office code, a country code, a city code or a rate center associated with destinations of calls corresponding to the failure responses, and
determining whether a number of failure responses received over a period of time or a percentage of calls for which failure responses have been received match at least one of the numbering plan area code, the central office code, the country code, the city code or the rate center.

2. The method of claim 1, wherein the determining whether the failure responses associated with calls forwarded toward the first destination indicate a problem, further comprises:
determining, by the network device, whether the failure responses received for calls forwarded toward the first destination exceed a predetermined level or percentage of total calls forwarded toward the first destination.

3. The method of claim 1, wherein the automatically determining whether the failure responses match at least one of a plurality of predefined patterns comprises:
matching the failure responses to portions of destination telephone numbers of calls associated with the failure responses.

4. The method of claim 1, further comprising:
determining whether a number of calls directed toward the first destination is less than a threshold; and
forwarding a portion or percentage of calls directed toward the first destination, when the failure responses indicate a problem, wherein the portion or percentage is less than the threshold.

5. The method of claim 1, wherein the blocking comprises:
blocking a first number of the second portion of calls from being forwarded toward the first destination, the method further comprising:
forwarding, when the failure responses indicate a problem, a second number of the second portion of calls toward the first destination.

6. The method of claim 5, further comprising:
identifying, when the failure responses indicate a problem, a threshold level corresponding to a maximum number of calls to be forwarded toward the first destination, and
wherein the second number of calls forwarded to the first destination does not exceed the threshold level.

7. The method of claim 1, wherein the blocking comprises:
blocking all of the second portion of calls from being forwarded to the first destination, the method further comprising:
identifying when the problem no longer exists; and
forwarding, when the problem no longer exists, calls to the first destination.

8. The method of claim 1, further comprising:
identifying restrictions to be imposed on calls directed toward the first destination, when the failure responses indicate a problem; and
forwarding or blocking calls directed toward the first destination in accordance with the restrictions.

9. A method, comprising:
receiving a plurality of calls;
identifying destinations associated with the plurality of calls, wherein a first portion of the plurality of calls are associated with a first destination;
receiving failure responses associated with at least some of the first portion of the plurality of calls;
determining whether the failure responses associated with calls forwarded toward the first destination indicate a problem or a possible problem associated with forwarding calls toward the first destination;
blocking, when the failure responses indicate a problem or a possible problem, at least some of the first portion of calls from being forwarded toward the first destination;
forwarding first congestion related information to a plurality of network devices configured to monitor calls in a network;
receiving second congestion related information from at least some of the network devices; and
processing a second plurality of calls in accordance with the received second congestion related information, wherein the processing the second plurality of calls comprises determining whether to forward or block each of the second plurality of calls, and
wherein the determining whether the failure responses associated with calls forwarded toward the first destination indicate a problem or a possible problem comprises:
identifying at least one of a numbering plan area code, a central office code, a country code, a city code or a rate center associated with destinations of calls corresponding to the failure responses, and
determining whether a number of failure responses received over a period of time or a percentage of calls for which failure responses have been received match at least one of the numbering plan area code, the central office code, the country code, the city code or the rate center.

10. The method of claim 1, wherein the plurality of calls correspond to voice over Internet protocol (VoIP) calls, and wherein destinations for the VoIP calls correspond to user devices coupled to a public switched telephone network.

11. A device, comprising:
a memory configured to store call response information, wherein the call response information includes failure responses indicating that at least some calls were unable to be completed; and
logic configured to:
receive a plurality of calls from user devices,
identify destinations associated with the plurality of calls,
determine, based on the call response information stored in the memory, whether failure responses associated with calls previously forwarded toward a first destination indicate a problem associated with forwarding calls toward the first destination, wherein the failure responses associated with calls previously forwarded toward the first destination indicate that the calls were unable to be completed, and wherein the determining whether failure responses associated with calls previously forwarded toward the first destination indicate a problem comprises:
automatically determining whether the failure responses match at least one of a plurality of predefined patterns, and
block, when the failure responses indicate a problem, at least some of the plurality of calls directed toward the first destination, and
wherein when automatically determining whether the failure responses match at least one of a plurality of predefined patterns, the logic is further configured to:
identify at least one of a numbering plan area code, a central office code, a country code, a city code or a rate center associated with destinations of calls corresponding to the failure responses, and
determine whether a number of failure responses received over a period of time or a percentage of calls for which failure responses have been received match at least one of the numbering plan area code, the central office code, the country code, the city code or the rate center.

12. The device of claim 11, wherein the logic is further configured to:
dynamically identify congestion conditions based on failure responses, and
process calls in accordance with the identified congestion conditions.

13. The device of claim 11, further comprising:
a communication interface configured to:
forward, to a plurality of other devices, information identifying first congestion conditions, and
receive, from the plurality of other devices, information identifying second congestion conditions, and
wherein the logic is further configured to process a second plurality of calls in accordance with received second congestion conditions.

14. The device of claim 11, wherein the plurality of calls correspond to voice over Internet protocol calls and the first destination corresponds to a switch in a public switched telephone network.

15. The device of claim 11, wherein the logic is further configured to:
forward a portion or percentage of a calls directed toward the first destination, when the failure responses indicate a problem, wherein the portion or percentage is less than a threshold.

16. A non-transitory computer-readable medium having stored thereon sequences of instructions which, when executed by at least one processor, cause the at least one processor to:
identify destinations associated with a plurality of calls received from user devices;
determine whether failure responses associated with calls previously forwarded toward a first destination indicate a problem associated with forwarding calls toward the first destination, wherein the failure responses associated with calls previously forwarded toward the first destination indicate that the calls were unable to be completed,
wherein when determining whether failure responses associated with calls previously forwarded toward the first destination indicate a problem, the instructions cause the at least one processor to:
automatically determine whether the failure responses match at least one of a plurality of predefined patterns; and
block, when the failure responses indicate a problem, at least some of the plurality of calls directed toward the first destination, and
wherein when automatically determining whether the failure responses match at least one of a plurality of predefined patterns, the instructions cause the at least one processor to:
identify at least one of a numbering plan area code, a central office code, a country code, a city code or a rate center associated with destinations of calls corresponding to the failure responses, and
determine whether a number of failure responses received over a period of time or a percentage of calls for which failure responses have been received match at least one of the numbering plan area code, the central office code, the country code, the city code or the rate center.

17. The non-transitory computer-readable medium claim 16, further including instructions for causing the at least one processor to:
forward a portion or percentage of a calls directed toward the first destination, when the failure responses indicate a problem, wherein the portion or percentage is less than a threshold.

18. The non-transitory computer-readable medium claim 16, further including instructions for causing the at least one processor to:
forward first congestion related information to a plurality of network devices configured to monitor calls in a network, wherein the network includes the first destination;
receive second congestion related information from at least some of the network devices; and
process a second plurality of calls in accordance with the received second congestion related information.

* * * * *